(12) United States Patent
Neufeld et al.

(10) Patent No.: US 8,099,095 B2
(45) Date of Patent: Jan. 17, 2012

(54) METHOD AND APPARATUS FOR CONTROLLING OPERATION OF AN ACCESS TERMINAL IN A COMMUNICATION SYSTEM

(75) Inventors: Arthur James Neufeld, Longmont, CO (US); Abhay Arvind Joshi, San Diego, CA (US); Don Nielsen Andrus, Carlsbad, CA (US); Remi Jonathan Gurski, San Diego, CA (US); Thunyachate Ekvetchavit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1240 days.

(21) Appl. No.: 10/375,724

(22) Filed: Feb. 25, 2003

(65) Prior Publication Data
US 2004/0166860 A1   Aug. 26, 2004

(51) Int. Cl.
*H04W 36/00* (2009.01)
(52) U.S. Cl. ........... 455/437; 455/436; 455/422.1; 455/439; 370/331; 370/329
(58) Field of Classification Search .......... 455/437, 455/436, 422.1, 574, 572, 343.1, 343.2, 343.4, 455/439; 370/331, 329, 311
See application file for complete search history.

(56) References Cited

U.S. PATENT DOCUMENTS

| | | | | |
|---|---|---|---|---|
| 5,546,384 A | * | 8/1996 | Dupuy et al. | 370/330 |
| 5,621,723 A | * | 4/1997 | Walton et al. | 370/335 |
| 5,790,954 A | * | 8/1998 | Tayloe et al. | 455/437 |
| 5,920,817 A | * | 7/1999 | Umeda et al. | 455/437 |
| 6,073,010 A | * | 6/2000 | Dufour | 455/432.3 |
| 6,094,427 A | * | 7/2000 | Yi | 370/331 |
| 6,175,736 B1 | * | 1/2001 | Lee et al. | 455/442 |
| 6,301,235 B1 | * | 10/2001 | Raaf et al. | 370/332 |
| 6,353,603 B1 | * | 3/2002 | Kim | 370/335 |
| 6,381,457 B1 | * | 4/2002 | Carlsson et al. | 455/435.2 |
| 6,577,608 B1 | * | 6/2003 | Moon et al. | 370/311 |
| 6,738,366 B1 | * | 5/2004 | Etemad et al. | 370/337 |
| 7,054,298 B1 | * | 5/2006 | Kim et al. | 370/342 |
| 2001/0041569 A1 | * | 11/2001 | Rahman | 455/436 |
| 2001/0041573 A1 | * | 11/2001 | Ishii et al. | 455/450 |

(Continued)

FOREIGN PATENT DOCUMENTS

FR        2702109        9/1994

(Continued)

OTHER PUBLICATIONS

International Search Report—PCT/US04/005542, International Searching Authority—European Patent Office, Nov. 11, 2004.

(Continued)

*Primary Examiner* — Ajit Patel
*Assistant Examiner* — Khai M Nguyen
(74) *Attorney, Agent, or Firm* — Kevin T. Cheatham (57) ABSTRACT

A novel and improved method and apparatus provide for controlling an operation of an access terminal while processing a signal from an access point in a communication system. Various aspects of the invention provide for an access terminal to disable a handoff process when its demodulator or decoder is operating to demodulate or decode a control message received from an access point. The operation of the access terminal is controlled in a manner that prevents terminating prematurely the demodulation and decoding process of a control signal by a handoff process. As a result, the access terminal may continue operating in a normal wake up/ sleep cycle period while conserving its battery power.

15 Claims, 4 Drawing Sheets

U.S. PATENT DOCUMENTS

| | | | | |
|---|---|---|---|---|
| 2001/0046864 | A1* | 11/2001 | Bhatoolaul et al. | 455/442 |
| 2002/0025811 | A1* | 2/2002 | Willey | 455/434 |
| 2002/0071403 | A1* | 6/2002 | Crowe et al. | 370/331 |
| 2002/0141360 | A1* | 10/2002 | Baba et al. | 370/331 |
| 2002/0167898 | A1* | 11/2002 | Thang et al. | 370/216 |
| 2004/0179506 | A1* | 9/2004 | Padovani et al. | 370/342 |

FOREIGN PATENT DOCUMENTS

| | | | |
|---|---|---|---|
| FR | 2702109 | A1 * | 9/1994 |
| JP | 11220764 | | 8/1999 |
| KR | 20000014423 | | 3/2000 |
| TW | 405105 | | 9/2000 |
| TW | 417379 | | 1/2001 |
| TW | 451161 | | 8/2001 |
| TW | 515154 | | 12/2002 |
| WO | 0010336 | | 2/2000 |

OTHER PUBLICATIONS

Written Opinion—PCT/US04/005542, International Searching Authority—European Patent Office, Nov. 11, 2004.

International Preliminary Report on Patentability—PCT/US04/005542, IPEA/US, Nov. 20, 2006.

Taiwanese Search Report—App. No. 093104650—TIPO—Jan. 21, 2010.

TIA/EIA Interim Standard: CDMA2000 High Rate Packet Data Air Interface Specfication, TIA/EIA/IS-856, Nov. 2000, pp. 1-450.

TIA/EIA Interim Standard: Mobile Station-Base Station Compatibility Standard for Dual-Mode Wideband Spread Spectrum Cellular System, TIA/EIA/IS-95 (Jul. 1993).

* cited by examiner

METHOD AND APPARATUS FOR CONTROLLING OPERATION OF AN ACCESS TERMINAL IN A COMMUNICATION SYSTEM

FIELD

The present invention relates generally to the field of communications, and more particularly, to controlling an operation of an access terminal in a communication system.

BACKGROUND

In a wireless communication system, unnecessary and excessive operation by an access terminal may cause substantial reduction in battery power of the access terminal. The data communicated between an access terminal and an access point may pass through several layers of protocols for assuring proper flow of data through the system. At the access terminal, the flow of data may be controlled by a processor. The processor may be in communication with a demodulator. The demodulator may include a decoder. The received signal is demodulated and decoded to produce decoded data. The decoded data are passed to the processor. The demodulator and decoder may have a number of components, including a digital signal processor, an application specific integrated circuit, and programmable components. Generally, a decision by the processor for controlling the flow of data may reach the demodulator and decoder portions in an uncontrollable manner such that the control process may terminate the operation of the demodulator or decoder prematurely. One example of a control process may include the process of handoff for the access terminal from a first access point to a second access point. The demodulator or decoder may be in the process of processing the signal from the first access point in the communication system when the handoff control process reaches the demodulator. When the operation of the demodulator or the decoder is terminated prematurely, the processed data may be lost. As a result, the access terminal may need to unnecessarily repeat one or more operations.

Therefore, there is a need to control an operation of an access terminal while processing a signal from an access point in a communication system.

SUMMARY

A method and apparatus provide for controlling operation of an access terminal efficiently. The method and associated apparatus include process steps and means for detecting start of a capsule of broadcast control messages based on a communication system timing, and disabling a handoff process of the access terminal based on the detecting. The operation of the access terminal is controlled as such that prevents terminating prematurely the demodulation and decoding process of a control signal by a handoff process. The access terminal may continue operating in a normal wake up/ sleep cycle period while conserving its battery power. After detecting the start of a capsule of broadcast control messages, if the access terminal fails to detect a preamble of a capsule of broadcast control messages based on failing to decode a series of data bits having a predefined data pattern, the access terminal enables the handoff process. The access terminal, after detecting a preamble, determines the start of a next packet of data in the capsule of broadcast control messages based on determining a packet length following the detected preamble. The access terminal searches for a next preamble at the start time of the next packet of data. If the access terminal fails to detect the next preamble, the access terminal enables the handoff process.

After detecting the preamble, the access terminal decodes the data following the detected preamble. If the access terminal detects a failure of the decoded data, the access terminal enables the handoff process. After decoding data following the detected preamble, if the access terminal detects an end of the capsule of broadcast control messages, the access terminal enables the handoff process.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Generally stated, a novel and improved method and apparatus provide for controlling an operation of an access terminal while processing a signal from an access point in a communication system. Various aspects of the invention provide for an access terminal to disable a handoff process when its demodulator or decoder is operating to demodulate or decode a control message received from an access point. The operation of the access terminal is controlled in a manner that prevents terminating prematurely the demodulation and decoding process of a control signal by a handoff process. As a result, the access terminal may continue operating in a normal wake up/ sleep cycle period while conserving its battery power. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
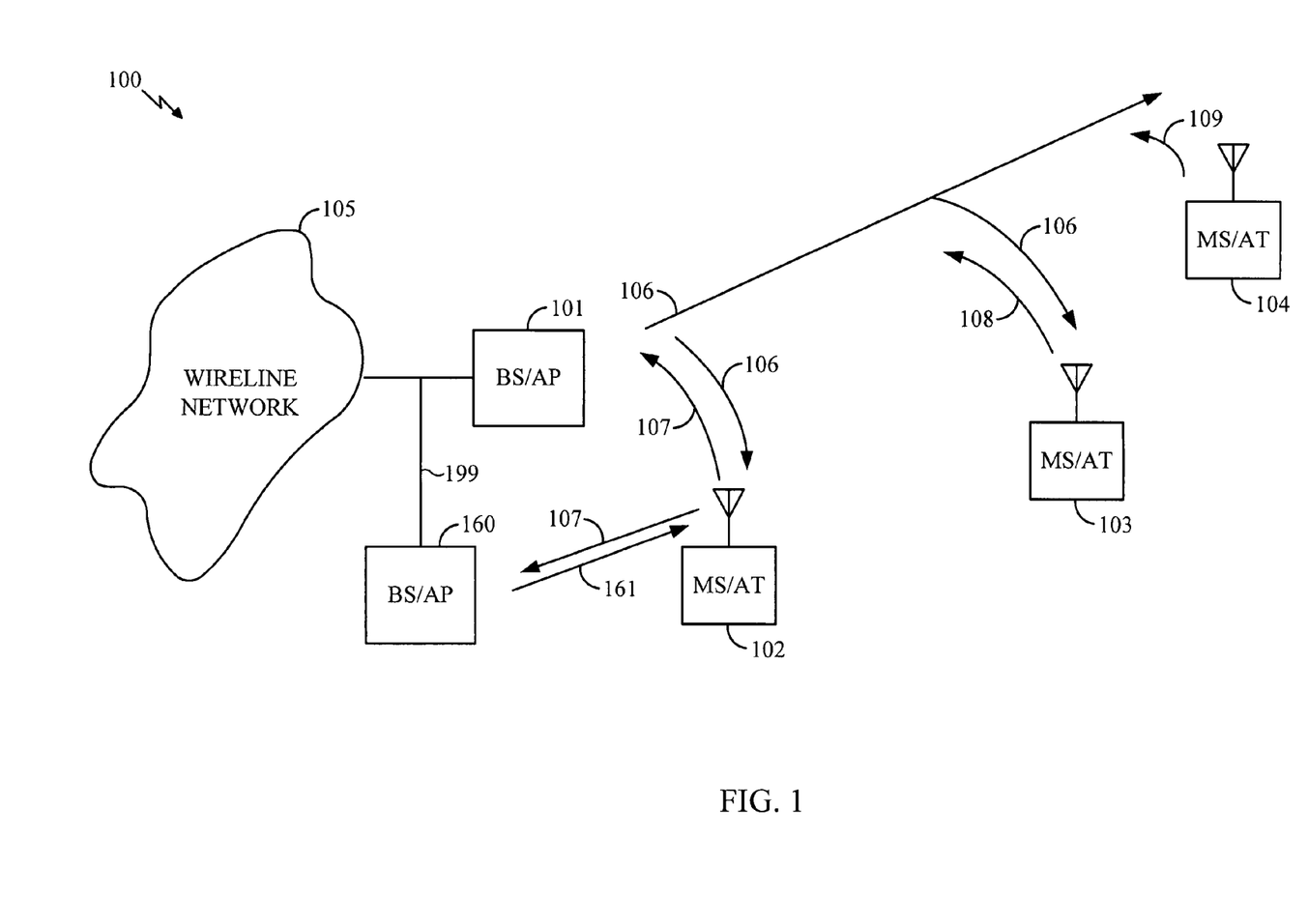
FIG. 1 depicts a communication system for transmitting and receiving data by an access terminal operating in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes an access point 101 that provides communication links between a number of access terminals, such as access terminals 102-104, and between the access terminals 102-104 and a public switch telephone and data network 105. The data access terminals (AT) in FIG. 1 may be referred to as mobile stations and the data access points (AP) as base stations without departing from the main scope and various advantages of the invention. AP 101 may include a number of components, such as an AP controller and an AP transceiver system. For simplicity, such components are not shown. AP 101 may be in communication with other access points, for example AP 160. An access network (AN) including AP 101 and 160 and various control nodes, not shown, may control various operating aspects of the communication system 100 and in relation to a back-haul 199 between network 105 and access points 101 and 160.

AP 101 communicates with each AT that is in its coverage area via a forward link signal transmitted from AP 101. The forward link signals targeted for access terminals 102-104 may be summed to form a forward link signal 106. The forward link may carry a number of different forward link channels. A control channel may also be included which may be shared among the access terminals for receiving control information. Such a control channel may be utilized to broadcast control information to all access terminals. Since the communication system may include a large number of access terminals, the transmission of the broadcast control messages for a group of access terminals may be dispersed over a time period.

For example, in IS-856 system, each AP broadcasts a capsule of control messages once every 426.7 milliseconds. When an AT is powered on and registers through one of the access points, an access network assigns one of the twelve possible channel cycles of 426.7 milliseconds within a 5.12 seconds period to the AT. The AT may keep the same assigned cycle as it moves among the access points. Each of the access terminals 102-104 receiving forward link signal 106 may decode the forward link signal 106 to extract the information that is targeted for its user. Therefore, each AT monitors the broadcast control channel once every 5.12 seconds for determining whether an AP is attempting to send the AT a control message. The AT demodulates and decodes the broadcast control message by waking up at least once every 5.12 seconds. Each AT is assigned a unique code. The preamble of the control messages, however, is encoded with a common code known by all access terminals. If the AT successfully decodes the preamble of the broadcast control message, the AT continues to decode the data following the preamble data. The message intended for the AT may be incorporated in a capsule of broadcast control messages. Therefore, the AT may need to demodulate and decode the entire capsule of messages to determine whether any message was transmitted for the AT. The capsule of broadcast control messages may have an end of message data that is incorporated in the message for indicating the end of the messages in the capsule.

During an assigned control channel cycle, if the AT fails to detect a preamble of the capsule of control messages, the AT enters a sleep mode and wakes up for the next control channel cycle. If the AT detects a preamble and unsuccessfully decodes the data following the preamble, the AT terminal may terminate monitoring the broadcast control channel and enter a sleep mode. The AT may wake up in the next control channel cycle to detect whether any messages is intended for it. If the AT detects a preamble and successfully decodes the data following the preamble, the AT terminal may respond to the message. The message may be a paging message for the AT. The paging message may include an indication that the AT may need to monitor another channel. The paging message may be used by the AP to establish a communication link with the AT. If the AT detects an end of message indicator in the capsule of control messages without a need to respond, the AT enters a sleep mode and wakes up at the next control channel cycle.

AP 160 may also communicate with the access terminals that are in its coverage area via a forward link signal transmitted from AP 160. Similar operation relating to the broadcast and reception of the capsule of control messages may be performed by the AP 160 and the access terminals that are in its coverage. Access terminals 102-104 may communicate with access points 101 and 160 via corresponding reverse links. Each reverse link is maintained by a reverse link signal, such as reverse link signals 107-109 for respectively access terminals 102-104. The reverse link signals 107-109, although may be targeted for one AP, it may be received at other access points.

Access points 101 and 160 may be attempting to simultaneously communicating to a common AT during a handoff process. The handoff process hands off the communication link from one AP to another. For example, AT 102 may be in close proximity of access points 101 and 160, which can maintain communications with both access points 101 and 160. At any time including this period of hand off, on the forward link, AP 101 may broadcast a capsule of control messages on forward link signal 106, and AP 160 on the forward link signal 161. The handoff process may take place while the AT 102 is attempting to demodulate a capsule of broadcast control messages on the forward link 106. If the handoff process takes place before completing the demodulation and decoding of a capsule of broadcast control messages transmitted on the forward link 106, the AT 102 may terminate the demodulation process prematurely and begin monitoring the forward link 161 for another capsule of broadcast control messages. Therefore, the AT 102 may not go back into a sleep period if it had not completed the demodulation and decoding of the capsule of broadcast control messages transmitted from the access point 101. As such, the access points involved in the handoff process may unnecessarily need to stay awake and perform processing of signals for a longer period of time and wasting battery power resources. To eliminate such a problem, in accordance with various aspects of the invention, each AT prevents completion of a handoff process and disables starting any handoff process until an end of message of the capsule of broadcast control messages has been detected.

On the reverse link, AT 102 transmits on reverse link signal 107 to be received by both access points 101 and 160. For transmitting a packet of data to AT 102, one of the access points 101 and 160 may be selected to transmit the packet of data to access terminal 102. On the reverse link, both access points 101 and 160 may attempt to decode the traffic data transmission from the access terminal 102. The data rate and power level of the reverse and forward links may be maintained in accordance with the channel condition between the AP and the AT. As the AT moves away from the first AP, the forward link from the first AP may not reach the AT at an adequate level to maintain the communication link at an adequate error rate. At this point, the handoff process should be completed, and the communication link with the AT should be with the second AP. The handoff process may be very quick, depending on the mobility speed of the AT.

The AT may be in an idle mode or in a traffic mode. In traffic mode, the AT has an active traffic link with the AP. In the idle mode, the AT monitors the control channels for receiving a control message during its assigned cycle. During idle mode, if the AT is decoding a capsule of broadcast messages transmitted from the first AP, the demodulation and decoding of the capsule of broadcast messages are continued, and the handoff process is disabled in the AT when the AT detects start of a capsule of broadcast messages. The start of the capsule of broadcast messages may be detected based on the communication system 100 timing and the assigned control channel cycle to the AT. If the AT detects start of a capsule of broadcast messages, the AT may decide to process the information relating to the handoff process, but prevents completion of the handoff process before completing the processing of the capsule of broadcast messages, in accordance with various aspects of the invention. The completion of the handoff process may include abandoning any communication link with the first AP and starting a new communication link with the second AP.

Figure 2:
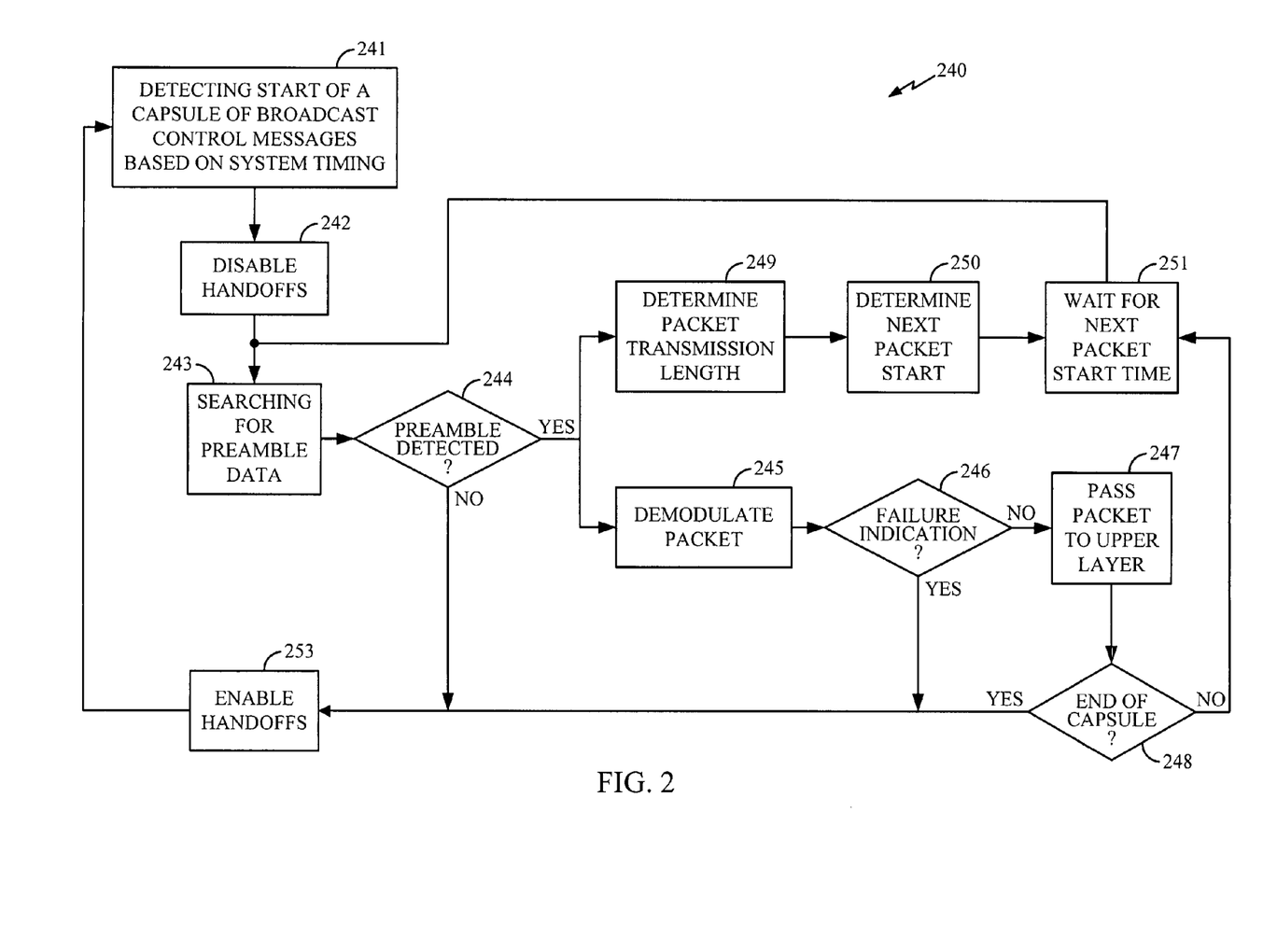
FIG. 2 depicts flow diagram of various steps for controlling operation of an access terminal in accordance with various aspects of the invention.

Various aspects of the invention may become more apparent by references to various operations depicted in FIG. 2 in a flow diagram 240. The steps and functions described and depicted in flow diagram 240 may be performed by a controller or a processor of an AT. At step 241, the AT may detect start of a capsule of broadcast control messages. The start of a capsule of broadcast control messages may be detected based on the system timing stored and measured by the AT. At step 242, the AT disables the handoff operation which prevents completing any handoff process if the AT has started a handoff process. The AT in accordance with an embodiment may gather data related to a handoff process and start a handoff process, if there is a need to initiate a handoff process based on the channel condition; however, the AT may not complete the handoff process if it has detected the start of a capsule of broadcast control messages at step 241, in accordance with various aspects of the invention.

Each packet in the capsule of broadcast control messages has a preamble. At step 243, the AT searches for a preamble data. The preamble may be a series of data bits having a specific pattern in each packet of the capsule of broadcast control messages. Therefore, the search for a preamble may include searching for a series of data bits that matches the preamble pattern. If no preamble is detected at step 244, the process flow moves to step 253 to enable the handoff process. At this point, if there is any need to complete a handoff process, the AT completes the handoff process. If a preamble is detected at step 244, the process flow 240 moves to steps 249 and 245. At step 245, the AT attempts to demodulate and decode the data following the preamble data. At step 246, the AT checks for a failure indication in the decoded data. If the data is decoded without any failure, the process flow moves to step 247 to pass the decoded data to an upper layer of protocols. If the data is decoded with an unacceptable type of failure, for example for failing to pass a cyclic redundancy check (CRC), the process flow moves to step 253 to enable the handoff process. The indication of a failure most likely is due to poor signal to noise condition of the received signal. In one case, the poor signal to noise ratio may be due to the AT moving away from the AP that transmitted the capsule of broadcast control messages.

After detecting the preamble at step 244, the process flow also determines the packet length following the detected preamble at step 249. The packet length and the data rate of the data following the preamble may be determined based on the pattern of the detected preamble. Based on the packet length information, at step 250, the process flow determines the start of the next packet of data in the capsule of broadcast control messages. At step 251, after an appropriate wait period corresponding to the expected start time of a next preamble, the process flow loops back to step 243 to look for other preamble in the capsule of the control messages to determine whether a preamble can be detected at step 244. Also, the process flow 240 at step 247, after passing the decoded packet of data to an upper layer, moves to step 248. At step 248, the process flow determines whether the end of the capsule of broadcast control messages has been reached. The end of the messages may be determined by decoding the messages in the packets. If the end of messages is detected, the process flow moves to step 253 to enable the handoff process. If the end of messages gas not been reached, the process flow 240 moves to step 251 and looping back to step 244 to look for another preamble.

Figure 3:
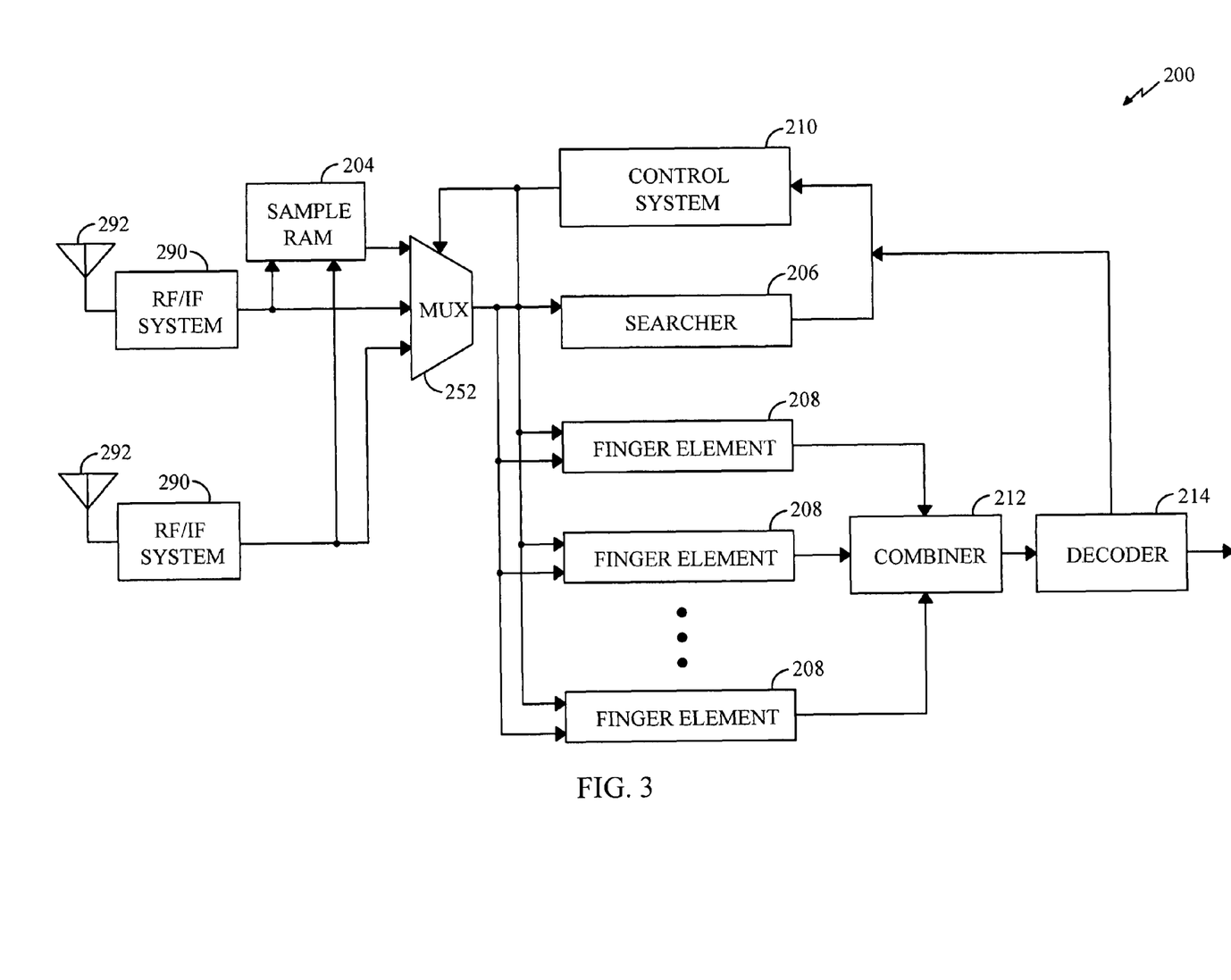
FIG. 3 depicts a receiver system for receiving data and being controlled in accordance with various aspects of the invention.

FIG. 3 illustrates a block diagram of a receiver 200 used for processing and demodulating the received CDMA signal while operating in accordance with various aspects of the invention. Receiver 200 may be used for decoding the information on the reverse and forward links signals. Receiver 200 may be used for decoding information on the fundamental channel, control channel and supplemental channels. Receiver 200 may be used for processing signals carrying a capsule of broadcast control messages in an AT operating in accordance with various aspects of the invention. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (mux) 252. The output of mux 252 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms. The signal transmitted from a source may be encoded with several layers of codes. The decoder 214 may perform decoding function in accordance with two or more codes. For example, the transmitted data may be encoded at two different layers, an outer layer and a physical layer. The physical layer may be in accordance with the Turbo code, and the outer layer may be in accordance with Reed Solomon code. As such, the decoder 214 decodes the received samples in accordance with such codes.

During operation, received samples are supplied to mux 252. Mux 252 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of access points 101 and 160 for processing the received reverse link signals from the access terminals, and in a receiver portion of any of the access terminals for processing the received forward link signals.

The decoder 214 may accumulate the combined energy for detection of a data symbol. Each packet of data may carry a cyclic redundancy check (CRC) field. The decoder 214 may in connection with control system 210 and or other control systems check for error in the received data packet. If the CRC data does not pass, the received packet of data has been received in error. The receiver 200 may be implemented in many different ways, such as use of ASIC, DSP and microprocessor. The processing of the decoded data, however, may be performed by a processor in connection with the receiver 200. Since the processing of received signal by receiver 200 is extensive and time critical, many aspects of the receiver 200 may be performed autonomously. For example, searching for pilot signal, demodulation and decoding of various signals, etc, maybe started and completed autonomously. In one specific example, when the receiver 200 starts processing a signal carrying a capsule of broadcast control messages, the process may be terminated by a command received from a controlling processor. The command may be generated due to a handoff process. In accordance with various aspects of the invention, an AT disables a handoff process when its demodulator or decoder is operating to demodulate or decode a control message received from an AP. The AT terminal may include a receiver, such as receiver 200, a transmitter and a processor. The operation of the AT is controlled in a manner that prevents terminating prematurely the demodulation and decoding process of a control signal by a handoff process. As a result, the AT may continue operating in a normal wake up/ sleep cycle period while conserving its battery power.

Figure 4:
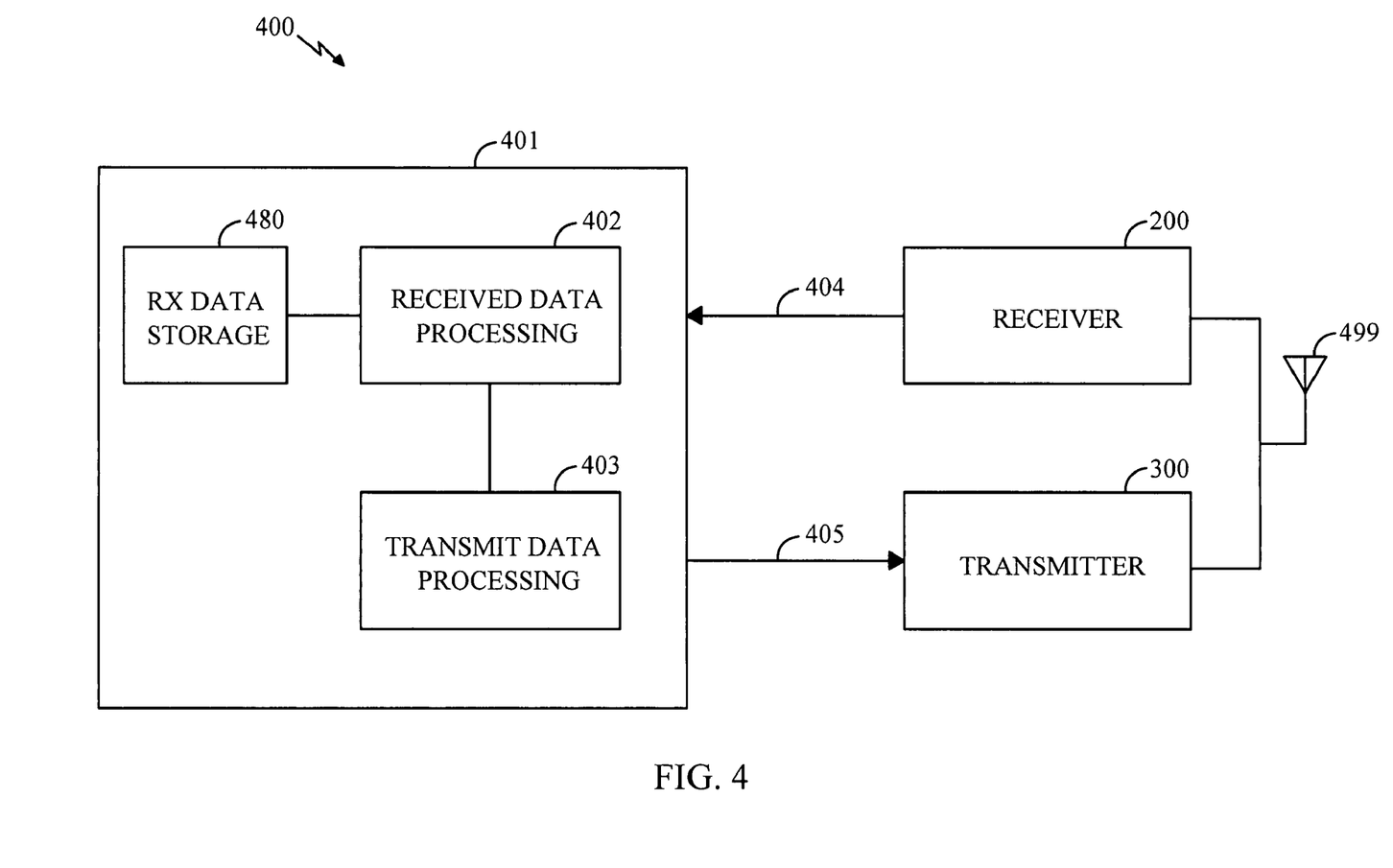
FIG. 4 depicts a transceiver system for transmitting and receiving data while operating in accordance with various aspects of the invention.

FIG. 4 depicts a general diagram of a transceiver system 400 for incorporating receiver 200 and a transmitter 300 for maintaining a communication link with a destination, including processing of a signal carrying a capsule of broadcast control messages. The transmitter 300 in transceiver 400 may be any known transmitter suitable for transmission of signal in accordance with a CDMA standard. Transceiver 400 maybe incorporated in an AT or an AP. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system 499 for RF/IF receiving and transmitting. Transmitter 300 receives the data for transmission on input 405. Transmit data processing block 403 prepares the data for transmission on a transmit channel. Received data, after being decoded in decoder 214, are received at processor 401 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or operates similar to a computer. The device may be connected to a data network, such as Internet. In case of incorporating the transceiver 400 in an access point, the access point through several connections may be connected to a network, such as Internet.

The processing of the received data generally includes checking for error in the received packets of data. The receive data storage block 480 may accumulate data received in each packet of data to reconstruct the entire block of data. The entire block of data may form a complete message transmitted from a source. The processor 401 in connection with received data processing block 402 may perform various aspects of flow chart 240 for enabling or disabling a handoff process in accordance with various aspects of the invention. For example, disabling handoff at step 242 and enabling handoff at step 253 may be communicated from processor 401 to receiver 200 in accordance with various aspects of the invention. The steps of looking for a preamble and determining whether a preamble is detected at steps 243 and 244 may be performed by the receiver 200. The results may be communicated to processor 401 via received data processing unit 402 for determining whether to enable handoff at step 253. Therefore, various steps of flow chart 240 may be performed by processor 401 and its internal units and other various steps by receiver 200.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for controlling operation of an access terminal, comprising:
    detecting a start of a capsule of broadcast control messages on a forward link based on a communication system timing;
    disabling by the access terminal a handoff process, between access points, of said access terminal based on the detected start of the capsule of broadcast control messages;
    detecting the preamble of the capsule of broadcast control messages based on a decoding of a series of data bits having predefined data pattern;
    determining start of a next packet of data in said capsule of broadcast control messages based on determining a packet length following said detected preamble; and
    enabling the handoff process after attempting to detect the preamble of the capsule of broadcast control messages.

2. The method as recited in claim 1 further comprising:
    searching for a next preamble at said start time of said next packet of data.

3. The method as recited in claim 2 further comprising:
    failing to detect said next preamble of said capsule of broadcast control messages based on failing to decode a series of data bits having a predefined data pattern; and
    enabling said handoff process of said access terminal based on said failing to detect said next preamble.

4. The method as recited in claim 1 further comprising:
    decoding data following said detected preamble;
    detecting a failure of said decoded data; and
    enabling said handoff process of said access terminal based on the detected failure of said decoded data.

5. The method as recited in claim 1 further comprising:
    decoding data following said detected preamble;
    detecting an end of said capsule of broadcast control messages; and
    enabling said handoff process of said access terminal based on said detected end of said messages.

6. The method as recited in claim 1, wherein:
    the step of detecting comprises detecting the start of the capsule of broadcast control messages based on an assigned cycle of a plurality of cycles for broadcasting capsules of control messages, the assigned cycle being assigned to the access terminal by the communication system; and
    the capsule of broadcast control messages comprises the preamble.

7. An apparatus for controlling operation of an access terminal, comprising:
    means for detecting a start of a capsule of broadcast control messages on a forward link based on a communication system timing;
    means for disabling by the access terminal a handoff process, between access points, of said access terminal based on the detected start of the capsule of broadcast control messages;
    means for detecting the preamble of the capsule of broadcast control messages based on a decoding of a series of data bits having predefined data pattern;
    means for determining start of a next packet of data in said capsule of broadcast control messages based on determining a packet length following said detected preamble; and
    means for enabling the handoff process after attempting to detect the preamble of the capsule of broadcast control messages.

8. The apparatus as recited in claim 7 further comprising;
    means for searching for a next preamble at said start time of said next packet of data.

9. The apparatus as recited in claim 8 further comprising:
    means for determining a failure to detect said next preamble of said capsule of broadcast control messages based on failing to decode a series of data bits having a predefined data pattern; and
    means for enabling said handoff process of said access terminal based on said failing to detect said next preamble.

10. The apparatus as recited in claim 7 further comprising:
    means for decoding data following said detected preamble;
    means for detecting a failure of said decoded data; and
    means for enabling said handoff process of said access terminal based on the detected failure of said decoded data.

11. The apparatus as recited in claim 7 further comprising:
    means for decoding data following said detected preamble;
    means for detecting an end of said capsule of broadcast control messages; and
    means for enabling said handoff process of said access terminal based on said detected end of said messages.

12. An access terminal for a wireless communication system, the access terminal comprising:
    a receiver configured to receive a capsule of broadcast control messages on a forward link; and
    a processor configured to:
    detect a start of the received capsule of broadcast control messages based on a communication system timing;
    disable by the access terminal a handoff process, between access point, of the access terminal based on the detected start of the capsule of broadcast control messages;
    detecting the preamble of the capsule of broadcast control messages based on a decoding of a series of data bits having a predefined data pattern;
    determining a start of a next packet of data in said capsule of broadcast control messages based on determining a packet length following said detected preamble: and
    enable the handoff process after attempting to detect the preamble of the capsule of broadcast control messages.

13. The access terminal of claim 12, wherein the processor is further configured to:
    determine a failure to detect a next preamble of the capsule of broadcast control messages based on a failure to decode a series of data bits having a predefined data pattern
    enable the handoff process of the access terminal based on the failure to detect the next preamble.

14. The access terminal of claim 12, wherein the processor is further configured to:
    decode data following the detected preamble;
    detect a failure of the decoded data; and
    enable the handoff process of the access terminal based on the detected failure of the decoded data.

15. A non-transitory computer-readable medium including computer, executable instructions encoded thereon for performing a method for controlling operation of an access terminal, the method comprising the steps of:
- detecting a start of a capsule of broadcast control messages on a forward link based on a communication system timing;
- disabling by the access terminal a handoff process, between access point, of the access terminal based on the detected start of the capsule of broadcast control messages;
- detecting the preamble of the capsule of broadcast control messages based on a decoding of a series of data bits having a predefined data pattern;
- determining a start of a next packet of data in said capsule of broadcast control messages based on determining a packet length following said detected preamble: and
- enabling the handoff process after attempting to detect the preamble of the capsule of broadcast control messages.

* * * * *